(12) United States Patent
Feng et al.

(10) Patent No.: US 12,523,777 B2
(45) Date of Patent: Jan. 13, 2026

(54) GPS INTERFERENCE SOURCE POSITIONING METHOD, APPARATUS, ELECTRONIC DEVICE, AND READABLE STORAGE MEDIA

(71) Applicant: BEIJING UNIVERSITY OF POSTS AND TELECOMMUNICATIONS, Beijing (CN)

(72) Inventors: Zhiyong Feng, Beijing (CN); Sai Huang, Beijing (CN); Jingchun Li, Beijing (CN); Yiliang Chen, Beijing (CN); Ping Zhang, Beijing (CN); Shuo Chang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 335 days.

(21) Appl. No.: 18/209,201

(22) Filed: Jun. 13, 2023

(65) Prior Publication Data

US 2024/0094406 A1 Mar. 21, 2024

(30) Foreign Application Priority Data

Sep. 13, 2022 (CN) .......................... 202211109311.2

(51) Int. Cl.
*G01S 19/21* (2010.01)
*G01S 5/02* (2010.01)
*G01S 19/42* (2010.01)

(52) U.S. Cl.
CPC ............ *G01S 19/21* (2013.01); *G01S 5/0249* (2020.05); *G01S 19/42* (2013.01)

(58) Field of Classification Search
CPC .......... G01S 19/21; G01S 19/42; G01S 19/14; G01S 2205/01; G01S 5/0249
See application file for complete search history.

(56) References Cited

U.S. PATENT DOCUMENTS

| 8,446,310 | B2* | 5/2013 | Law | H04K 3/22 |
| | | | | 342/16 |
| 2013/0217358 | A1* | 8/2013 | Snider | H04W 12/122 |
| | | | | 455/411 |
| 2019/0219705 | A1* | 7/2019 | Akos | G01S 5/06 |

FOREIGN PATENT DOCUMENTS

| CN | 103974280 A | 8/2014 |
| CN | 105717486 A | 6/2016 |

(Continued)

OTHER PUBLICATIONS

B. R. Rao, E. N. Rosario and R. J. Davis, "Radiation Pattern Analysis of Aircraft Mounted GPS Antennas and Verification Through Scale Model Testing," 2006 IEEE/ION Position, Location, and Navigation Symposium, Coronado, CA, USA, 2006, pp. 306-318, doi: 10.1109/PLANS.2006.1650617. (Year: 2006).*

(Continued)

*Primary Examiner* — Vladimir Magloire
*Assistant Examiner* — Anna K. Gosling
(74) *Attorney, Agent, or Firm* — Bret E. Field; Bozicevic, Field & Francis LLP (57) ABSTRACT

The present invention provides a GPS interference source positioning method, apparatus, electronic device, and readable storage medium, which relates to the technical field of wireless communications. The method includes: acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point; acquiring a confidence of each ground point in a set of ground points as (Continued)

a positioning point of the GPS interference source according to the first signal strength and the second signal strength; acquiring a predicted positioning point of the GPS interference source from the set of ground points according to the confidence. The solution of the present invention can improve the positioning accuracy of the GPS interference source.

10 Claims, 2 Drawing Sheets

(56) References Cited

FOREIGN PATENT DOCUMENTS

| CN | 108696886 | A |   | 10/2018 |   |          |
|----|-----------|---|---|---------|---|----------|
| CN | 110879380 | A |   | 3/2020  |   |          |
| CN | 110988922 | A |   | 4/2020  |   |          |
| CN | 110988923 | A | * | 4/2020  | . | G01S 19/21 |
| CN | 111836189 | A |   | 10/2020 |   |          |
| CN | 112083446 | A |   | 12/2020 |   |          |
| CN | 112636812 | A |   | 4/2021  |   |          |
| CN | 110988922 | B | * | 9/2021  | . | G01S 19/21 |
| CN | 113568010 | A | * | 10/2021 | . | G01S 19/37 |
| CN | 113655502 | A |   | 11/2021 |   |          |
| CN | 113938228 | A |   | 1/2022  |   |          |
| CN | 114142954 | A |   | 3/2022  |   |          |
| CN | 114281101 | A |   | 4/2022  |   |          |

OTHER PUBLICATIONS

Gong et al., An Antenna Radiation Pattern Coordinate Conversion Program Based on MATLAB, National Laboratory of Science and Technology on Antennas and Microwaves, Xi'dian University, p. 92-94, and its English abstract, 3 pages.

Gong, The Development of a Software about Radiation Pattern Transformation in Different Coordinates, Xidian University, Dec. 2015, and its English abstract, 86 pages.

Luan et al., Interference locating algorithm based on scattered plane signals, Systems Engineering and Electronics, Dec. 2014, vol. 36, No. 12, and its English abstract, 5 pages.

China Radio, Method research for locating interference sources using multi-TDOA values generated by the perturbations of two geostationary orbit satellites, Nov. 2019, China Academic Journal Electronic Publishing House, http://www.cnki.net, p. 60-63, and its English abstract, 5 pages.

Gong, Research on Jammer Source Positioning Methods in UAV Networks, May 28, 2020, Beijing University of Posts and Telecommunications, Thesis for Master Degree, and its English abstract, 18 pages.

* cited by examiner

GPS INTERFERENCE SOURCE POSITIONING METHOD, APPARATUS, ELECTRONIC DEVICE, AND READABLE STORAGE MEDIA

This application claims priority to Chinese Patent Application No. 202211109311.2, filed with the China National Intellectual Property Administration on Sep. 13, 2022, the disclosure of which application is incorporated herein by reference in its entirety.

TECHNICAL FIELD

The present application relates to the technical field of wireless communications, and in particular to a GPS interference source positioning method, apparatus, electronic device, and readable storage medium.

BACKGROUND

The positioning system determines the position of a flight device by receiving satellite GPS signals. However, due to the limited GPS frequency band and usually very weak satellite GPS signal strength, the satellite GPS signals received by the positioning system are prone to interference. In recent years, the number of malfunctions and accidents caused by GPS interference has rapidly increased, mainly due to the illegal use of GPS frequency band resources by a large number of civilian equipment. Such civilian equipment transmits high-power signals of the GPS frequency band without approval, resulting in co-frequency suppression interference to the satellite GPS signals received by the flight device. In view of this, there is an urgent need for a GPS interference source positioning method to complete the positioning of the GPS interference source.

However, existing GPS interference source positioning method can use linearization dimension reduction and least square method to achieve 3D ellipsoid GPS interference source positioning, the channel modeling is rough, making it difficult to ensure positioning accuracy. GPS interference source positioning can also be achieved by modeling the electromagnetic propagation environment or using base station information to obtain transmission loss. However, these methods are too affected by actual environmental changes and the surrounding environment of the base station, and it is difficult to ensure positioning accuracy.

SUMMARY

The purpose of the present invention is to provide a GPS interference source positioning method, apparatus, electronic device, and readable storage medium to solve the problem of difficulty in ensuring the positioning accuracy of the GPS interference source in the prior art.

In order to achieve the above purpose, an embodiment of the present invention provides a GPS interference source positioning method, including:
    acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;
    acquiring a confidence of each ground point in a set of ground points as a positioning point of the GPS interference source according to the first signal strength and the second signal strength;
    acquiring a predicted positioning point of the GPS interference source from the set of ground points according to the confidence.
Optionally, the method further comprises:
    acquiring a target signal strength which is the first signal strength or the second signal strength by following steps:
    acquiring a target orientation of the ground point relative to a target position point in a GPS antenna pattern of the flight device, wherein the target position point is a position point of the flight device at the first moment or the second moment;
    acquiring the target signal strength corresponding to the target orientation in the GPS antenna pattern.
Optionally, the method further comprises:
    acquiring the target position point by following steps:
    acquiring aeronautical data of the flight device in an automatic dependent surveillance-broadcast (ADS-B) system;
    selecting a position information loss route according to the aeronautical data;
    extracting the target position point affected by the GPS interference source from the position information loss route.
Optionally, the method further comprises:
    acquiring the GPS antenna pattern by following steps:
    performing 3D modeling on a body of the flight device to obtain a body model;
    performing electromagnetic simulation on a GPS antenna of the flight device on the body model based on diffraction theory to obtain the GPS antenna pattern.
Optionally, the GPS antenna pattern comprises correspondences between orientations and gains.
Optionally, acquiring the target orientation of the ground point relative to the target position point in the GPS antenna pattern of the flight device comprises:
    acquiring a distance between the ground point and the target position point according to coordinates of the ground point and coordinates of the target position point;
    acquiring a first included angle between a target connecting line and a first coordinate axis of the GPS antenna pattern according to the distance; wherein the target connecting line is a connecting line between the ground point and a body mass point of the flight device;
    acquiring a second included angle between a projection line of the target connecting line on a first plane of the GPS antenna pattern and a second coordinate axis according to the coordinates of the ground point and the coordinates of the target position point;
    acquiring the target orientation according to the first included angle and the second included angle.
Optionally, in a case where an attitude angle of the flight device is not a preset angle, the method further comprises:
    acquiring a rotation matrix according to the attitude angle;
    determining the coordinates of the ground point after rotation according to the rotation matrix.
Optionally, acquiring the target signal strength of the GPS interference signal received by the flight device at the first moment comprises:
    acquiring free space propagation loss according to a distance between the ground point and the target position point and a signal frequency of the GPS interference source located at the ground point;

acquiring the target signal strength according to a target gain corresponding to the target orientation in the GPS antenna pattern and the free space propagation loss.

Optionally, acquiring the confidence of each ground point in the set of ground points as the positioning point of the GPS interference source according to the first signal strength and the second signal strength comprises:

acquiring an interference source judgment identification value of each ground point in the set of ground points according to the first signal strength and the second signal strength, wherein the interference source judgment identification value is used for indicating whether the ground point can serve as a candidate positioning point for the GPS interference source;

acquiring the confidence of each ground point in the set of ground points as the positioning point of the GPS interference source based on the interference source judgment identification value corresponding to each position information loss route in a set of position information loss routes.

Optionally, acquiring the interference source judgment identification value of each ground point in the set of ground points according to the first signal strength and the second signal strength comprises:

if an absolute value of a difference between the first signal strength and the second signal strength is less than or equal to a first threshold, the first signal strength is greater than a second threshold, and the second signal strength is greater than the second threshold, then the interference source judgment identification value is a preset identification value.

Optionally, acquiring the predicted positioning point of the GPS interference source from the set of ground points according to the confidence comprises:

selecting a ground point with a highest confidence in the set of ground points as the predicted positioning point of the GPS interference source.

In order to achieve the above purpose, an embodiment of the present invention provides a GPS interference source positioning apparatus, comprising:

a first acquisition module, which is configured for acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;

a second acquisition module, which is configured for acquiring a confidence of each ground point in a set of ground points as a positioning point of the GPS interference source according to the first signal strength and the second signal strength;

a third acquisition module, which is configured for acquiring a predicted positioning point of the GPS interference source from the set of ground points according to the confidence.

In order to achieve the above purpose, an embodiment of the present invention provides an electronic device, comprising a transceiver, a processor, a memory, and a program or instructions stored on the memory and capable of running on the processor, wherein the processor implements steps in any GPS interference source positioning method as described above when executing the program or instructions.

In order to achieve the above purpose, an embodiment of the present invention provides a readable storage medium having stored a program or instructions thereon, wherein the program or instructions, when executed by a processor, causes the processor to implement steps of any GPS interference source positioning method as described above.

The beneficial effects of the above technical solution of the present invention are as follows:

In the above solution of the embodiment of the present invention, by acquiring a first signal strength of a GPS interference signal received by a flight device at a first moment, and acquiring a second signal strength of the GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point; acquiring a confidence of each ground point in a set of ground points as a positioning point of the GPS interference source according to the first signal strength and the second signal strength; acquiring a predicted positioning point of the GPS interference source from the set of ground points according to the confidence, the GPS interference source positioning method is optimized, thus ensuring the positioning accuracy, and improving the accuracy and reliability of the positioning results for high GPS interference sources.

DETAILED DESCRIPTION

In order to clarify the technical problem to be solved by the present invention, solution, and advantage, a detailed description will be given below in conjunction with the accompanying drawings and specific embodiments.

It should be understood that the reference to "one embodiment" or "an embodiment" throughout the description means that specific features, structures, or characteristics related to the embodiment are included in at least one embodiment of the present invention. Therefore, the words "in one embodiment" or "in an embodiment" appearing throughout the description may not necessarily refer to the same embodiment. In addition, these specific features, structures, or characteristics can be combined in one or more embodiments in any suitable manner.

In various embodiments of the present invention, it should be understood that the size of the sequence numbers of the following processes does not imply the order of execution. The execution order of each process should be determined by its function and internal logic, and should not constitute any restrictions on the implementation process of the embodiments of the present invention.

In addition, the terms "system" and "network" are often used interchangeably in this article.

In the embodiments provided in the present application, it should be understood that "B corresponding to A" indicates that B is associated with A, and B can be determined based on A. But it should also be understood that determining B based on A does not mean determining B solely based on A, and B can also be determined based on A and/or other information.

To enable those skilled in the art to better understand the embodiments of the present invention, the following explanation will be provided first.

GNSS (Global Navigation Satellite System) refers to all satellite navigation systems, including global, regional, and enhanced satellite navigation systems. For example, the global system include GPS (Global Positioning System), GLONASS (Global Navigation Satellite System) Galileo (Galileo satellite navigation system), COMPASS (Beidou satellite navigation system); Regional systems include QZSS (Quasi Zenith Satellite System) and IRNSS (Indian Regional Navigation Satellite System); and enhanced systems include WAAS (Wide Area Augmentation System), EGNOS (European Geostationary Navigation Overlay Service), MSAS (Multi Functional Satellite Augmentation System), etc.

Therefore, the GPS interference source positioning method in the embodiment of the present invention is also applicable to other GNSS interference source positioning methods.

Figure 1:
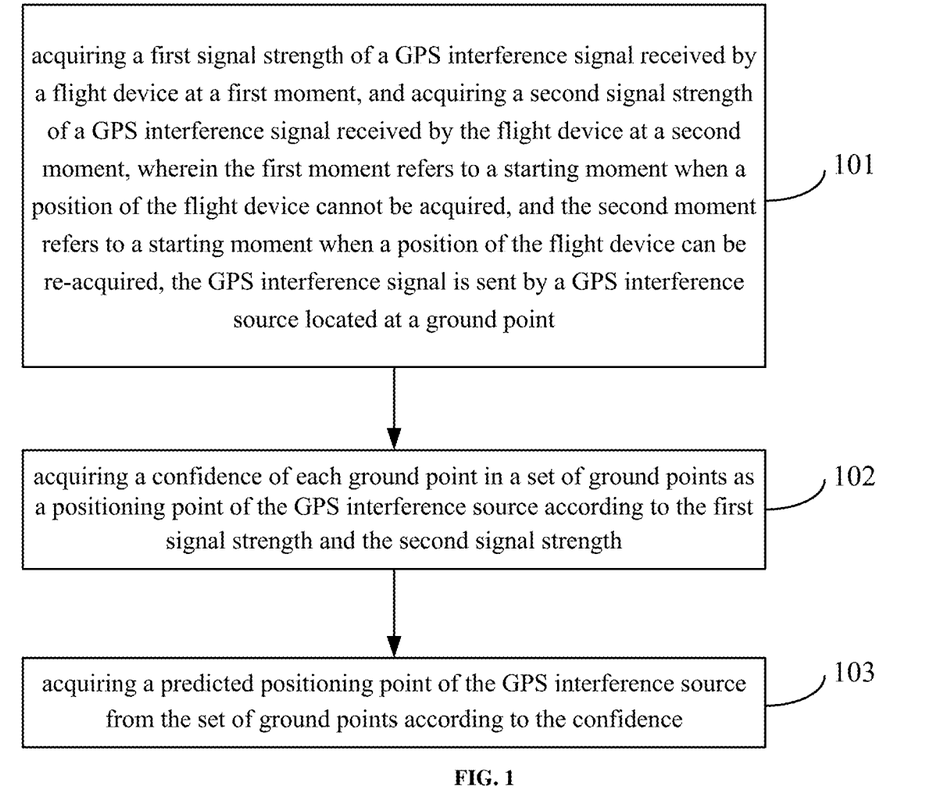
FIG. 1 is a flowchart of a GPS interference source positioning method according to an embodiment of the present invention.

Refer to FIG. 1, which is a flowchart of a GPS interference source positioning method provided by the embodiment of the present invention, as shown in FIG. 1, including the following steps:

step 101, acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when a position of the flight device can be re-acquired, the GPS interference signal is sent by a GPS interference source located at a ground point.

Wherein the first moment can be understood as a moment when the position point of the flight device is lost, and the second moment can be understood as a moment when the position point of the flight device is re-acquired. Between the first moment and the second moment, the flight device is unable to locate its position due to the co-frequency suppression interference caused by the GPS interference signal sent by a GPS interference source.

The GPS interference source is an unapproved GPS signal sending device on the ground.

Flight device can be an airplane or a drone.

Step 102, acquiring a confidence of each ground point in a set of ground points as a positioning point of the GPS interference source according to the first signal strength and the second signal strength.

It should be noted that based on the longitude and latitude of the ground, the ground is meshed to obtain multiple ground points, a set of ground points including the multiple ground points, and the coordinates of each ground point.

Acquiring the confidence of each ground point as the positioning point of the GPS interference source according to the first signal strength and the second signal strength means acquiring the possibility of the position of each ground point as the positioning position of the GPS interference source.

Step 103, acquiring a predicted positioning point of the GPS interference source from the set of ground points according to the confidence.

It should be noted that if there are N position information loss routes for the first moment and the second moment, i.e., N flight devices, it is needed to calculate the confidence of each ground point for each flight device. Then, a predicted positioning point is selected for a GPS interference source according to confidences of all ground points, that is, acquiring a predicted positioning location of the GPS interference source.

In the embodiment of the present invention, by acquiring a first signal strength of a GPS interference signal received by a flight device at a first moment, and acquiring a second signal strength of the GPS interference signal received by the flight device at a second moment, wherein the first moment refers to a starting moment when the position of the flight device cannot be acquired, and the second moment refers to a starting moment when the position of the flight device can be re-acquired, the GPS interference signal is sent by a GPS interference source located at a ground point; acquiring the confidence of each ground point in a set of ground points as a positioning point of the GPS interference source according to the first signal strength and the second signal strength; acquiring a predicted positioning point of the GPS interference source from the set of ground points according to the confidence, the GPS interference source positioning method is improved, ensuring the positioning accuracy, and improving the accuracy and reliability of the positioning results for high GPS interference sources.

In an embodiment of the present invention, the above method further includes:
acquiring a target signal strength which is the first signal strength or the second signal strength by following steps:
acquiring a target orientation of the ground point relative to a target position point in a GPS antenna pattern of the flight device, wherein the target position point is a position point of the flight device at the first moment or the second moment;
acquiring the target signal strength corresponding to the target orientation in the GPS antenna pattern.

It should be noted that a spherical coordinate system is used to describe a target orientation of the ground point relative to the target position point in the GPS antenna pattern, and then a target signal strength corresponding to the target orientation is acquired through the GPS antenna pattern.

In an embodiment of the present invention, the above method further includes:
acquiring the target position point by following steps:
acquiring aeronautical data of the flight device in an automatic dependent surveillance-broadcast (ADS-B) system;
selecting a position information loss route according to the aeronautical data;
extracting the target position point affected by the GPS interference source from the position information loss route.

It should be noted that the ADS-B system acquires aeronautical data of each flight device in a flight device set, then searches all aeronautical data for N position information loss routes, and extracts, from the k-th position information loss route, a target position point including the position loss point or the position regain point, which is the position point of the flight device at the first or second moment.

In an embodiment of the present invention, the above method further includes:
acquiring the GPS antenna pattern by following steps:
performing 3D modeling on a body of the flight device to obtain a body model;
performing electromagnetic simulation on the GPS antenna of the flight device on the body model based on diffraction theory to obtain the GPS antenna pattern.

First, 3D modeling is performed on the appearance of the body of the flight device to obtain the body model of the flight device.

Then, electromagnetic simulation software was used to perform electromagnetic simulation modeling and electromagnetic analysis on the GPS antenna of the flight device on the body model based on diffraction theory, thereby obtaining the near field GPS antenna pattern on the top of the aircraft.

In a specific embodiment of the present invention, the GPS antenna pattern includes correspondences between orientations and gains.

That is to say, after using electromagnetic simulation software to perform electromagnetic simulation modeling and electromagnetic analysis on the GPS antenna of the flight device based on diffraction theory, the gain of the GPS antenna on the top of the aircraft corresponding to each orientation can be obtained.

In a specific embodiment of the present invention, acquiring the target orientation of the ground point relative to the target position point in the GPS antenna pattern of the flight device includes:
acquiring a distance between the ground point and the target position point according to coordinates of the ground point and coordinates of the target position point;
acquiring a first included angle between a target connecting line and a first coordinate axis of the GPS antenna pattern according to the distance; wherein the target connecting line is a connecting line between the ground point and the body mass point of the flight device;
acquiring a second included angle between a projection line of the target connecting line on a first plane of the GPS antenna pattern and a second coordinate axis according to the coordinates of the ground point and the coordinates of the target position point;
acquiring the target orientation according to the first included angle and the second included angle.

It should be noted that specific process of acquiring the target orientation is as follows:

Firstly, for the k-th position information loss route, establishing an equation for the distance between the ground point and the target position point:

$$d_{s_k g} = \sqrt{(x_g - x_{s_k})^2 + (y_g - y_{s_k})^2 + (z_g - z_{s_k})^2}$$

$$d_{e_k g} = \sqrt{(x_g - x_{e_k})^2 + (y_g - y_{e_k})^2 + (z_g - z_{e_k})^2}$$

wherein, $(x_g, y_g, z_g)$ represents coordinates of the ground point; since the coordinates of the target position point include position point coordinates $(x_{e_k}, y_{e_k}, z_{e_k})$ of the flight device at the first moment and position point coordinates $(x_{e_k}, y_{e_k}, z_{e_k})$ of the flight device at the second moment, $d_{s_k g}$ represents a distance between the ground point and the position point of the flight device at the first moment, and $d_{e_k g}$ represents a distance between the ground point and the position point of the flight device at the second moment.

Then, when the attitude angle of the flight device is a preset angle, a first included angle and a second included angle are calculated according to the following formula:

$$\begin{cases} \theta_{e_k} = \arccos \dfrac{z_g - z_{e_k}}{d_{e_k g}} \\ \varphi_{e_k} = \arctan \dfrac{y_g - y_{e_k}}{x_g - x_{e_k}} \end{cases}$$

$$\begin{cases} \theta_{s_k} = \arccos \dfrac{z_g - z_{s_k}}{d_{s_k g}} \\ \varphi_{s_k} = \arctan \dfrac{y_g - y_{s_k}}{x_g - x_{s_k}} \end{cases}$$

wherein, θ represents the first included angle, which is an included angle between the connecting line, which connects the ground point and the body mass point of the flight device, and the first coordinate axis of the GPS antenna pattern. Here, the first coordinate axis is the positive z-axis of the GPS antenna pattern coordinate system;

φ represents the second included angle, which is an included angle between a projection line of the connecting line, which connects the ground point and the body mass point of the flight device on a first plane of the GPS antenna pattern, and the second coordinate axis. Here, the first plane is a xy plane of the GPS antenna pattern coordinate system, and the second coordinate axis is a positive x-axis of the GPS antenna pattern coordinate system;

The body mass point coordinates at the first moment of the flight device are equal to the position point coordinates $(x_{e_k}, y_{e_k}, z_{e_k})$ of the flight device at the first moment, and the body mass point coordinates at the second moment of the flight device are equal to the position point coordinates $(x_{\theta_k}, y_{\theta_k}, z_{\theta_k})$ of the flight device at the second moment.

Thus, the target orientation is obtained according to the first included angle and the second angle, and includes the orientation $(\theta_{e_k}, \varphi_{e_k})$ of the ground point relative to the position point (position loss point) of the flight device at the first moment and the orientation $(\theta_{s_k}, \varphi_{s_k})$ of the ground point relative to the position point (position regain point) of the flight device at the second moment.

In addition, in the case where the attitude angle of the flight device is not a preset angle, the above method further includes:
acquiring a rotation matrix according to the attitude angle;
determining the coordinates of the ground point after rotation according to the rotation matrix.

It should be noted that when the attitude angle of the flight device is not the preset angle, it can be understood as the rotation of the GPS antenna pattern. For the GPS antenna pattern described in a Cartesian coordinate system, by rotating along the x axis, y axis or z axis, a rotation matrix can be obtained through the attitude angle, so as to obtain the coordinates of the ground point and coordinates of the target position point after rotation.

Wherein the rotation matrix is as follows:

$$R_z(\alpha) = \begin{bmatrix} \cos\theta & -\sin\theta & 0 \\ \sin\theta & \cos\theta & 0 \\ 0 & 0 & 1 \end{bmatrix}$$

-continued $$R_x(\beta) = \begin{bmatrix} 1 & 0 & 0 \\ 0 & \cos\beta & -\sin\beta \\ 0 & \sin\beta & \cos\beta \end{bmatrix}$$

$$R_y(\gamma) = \begin{bmatrix} \cos\gamma & 0 & \sin\gamma \\ 0 & 1 & 0 \\ -\sin\gamma & 0 & \cos\gamma \end{bmatrix}$$

$R_z(\alpha)$ represents rotation around the z-axis; $R_x(\beta)$ represents rotation around the x-axis; $R_y(\gamma)$ represents rotation around the y-axis.

The coordinates of the ground point $(x'_g, y'_g, z'_g)$ after rotating the GPS antenna pattern coordinate system can be calculated according to the above rotation matrix:

$$(x'_g, y'_g, z'_g)^T = R_z(\alpha) R_x(\beta) R_y(\gamma) (x_g, y_g, z_g)^T$$

The formulas of the first included angle and the second included angle when the attitude angle of the flight device is a preset angle are replaced with the coordinates of the ground point $(x'_g, y'_g, z'_g)$ after rotation, thereby obtaining the orientation of the ground point relative to the target position point in the GPS antenna pattern when the attitude angle of the flight device is not a preset angle.

It should also be noted that the preset angle described above is generally 0 degrees.

In a specific embodiment of the present invention, acquiring the target signal strength of the GPS interference signal received by the flight device at the first moment includes:
  acquiring free space propagation loss according to a distance between the ground point and the target position point and a signal frequency of the GPS interference source located at the ground point;
  acquiring the target signal strength according to a target gain corresponding to the target orientation in the GPS antenna pattern and the free space propagation loss.

Firstly, calculate a free space propagation loss FSPL according to the following formula:

FSPL=32.45+20l gd+20l gfreq (dB)

wherein, d represents the distance between the ground point and the target position point, which can specifically be taken as $d_{s_kg}$ or $d_{e_kg}$; freq represents the signal frequency of the GPS interference source located at the ground point, in MHz.

Then, calculate the target signal strength RSSI according to the following formula:

RSSI=−FSPL+$G_r$ wherein, $G_r$ represents the target gain corresponding to the target orientation in the GPS antenna pattern. It should be noted that the gain in the GPS antenna pattern is a pattern parameter calculated based on diffraction theory by modeling through electromagnetic simulation.

It should be noted that the target signal strength RSSI is a first signal strength $RSSI_s$ or a second signal strength $RSSI_e$. The first signal strength $RSSI_s$ is the signal strength of the GPS interference signal sent by the GPS interference source located at the ground point received by the flight device at the first moment, that is, a position point loss moment; the second signal strength $RSSI_e$ is the signal strength of the GPS interference signal sent by the GPS interference source located at the ground point received by the flight device at the second moment, that is, a position point regain moment.

In an embodiment of the present invention, the step 102 includes:
  acquiring an interference source judgment identification value of each ground point in the set of ground points according to the first signal strength and the second signal strength, wherein the interference source judgment identification value is used for indicating whether the ground point can serve as a candidate positioning point for the GPS interference source;
  acquiring the confidence of each ground point in the set of ground points as the positioning point of the GPS interference source based on the interference source judgment identification value corresponding to each position information loss route in a set of position information loss routes.

Firstly, acquire an interference source judgement identification value $res_k$ corresponding to the k-th position information loss route, and then calculate the confidence $P(g)$ of each ground point in the set of ground points as the positioning point of the GPS interference source according to the following formula:

$$P(g) = \sum_{k=1}^{N} \frac{res_k}{N}$$

wherein, N represents the number of position information loss routes.

In a specific embodiment of the present invention, acquiring the interference source judgment identification value of each ground point in the set of ground points according to the first signal strength and the second signal strength includes:
  if an absolute value of a difference between the first signal strength and the second signal strength is less than or equal to a first threshold, the first signal strength is greater than the second threshold, and the second signal strength is greater than the second threshold, then the interference source judgment identification value is a preset identification value.

It should be noted that for the k-th position information loss route, the interference source judgement identification value $res_k$ is set to a preset identification value when the first signal strength $RSSI_s$ and the second signal strength $RSSI_e$ meet the following conditions:

|$RSSI_s$−$RSSI_e$|<=thr1

$RSSI_s$>thr2

$RSSI_e$>thr2 wherein, thr1 is the first threshold and thr2 is the second threshold, the first threshold and the second threshold are determined based on empirical or measured values; when the preset identification value is equal to 1, that is, when the above conditions are met, $res_k$=1.

In an embodiment of the present invention, the step 103 includes:
  selecting a ground point with the highest confidence in the set of ground points as the predicted positioning point of the GPS interference source.

It should be noted that for each ground point in the set of ground points, a confidence $P(g)$ that this ground point serves as the GPS interference source is calculated, and then the ground point with the highest confidence is selected as the predicted positioning point of the GPS interference source according to the following formula, thereby achieving the GPS interference source positioning:

$$loc = \underset{g \in G}{\mathrm{argmax}}\, P(g) \qquad 5$$

wherein, G represents the set of ground points and loc represents an index of the predicted positioning point in the set of ground points.

In summary, the GPS interference source positioning method in the embodiment of the present invention calculates the signal strength based on diffraction theory and free space loss channel model, which is more effective and accurate. Moreover, the aeronautical data of the flight device in the ADS-B system is decoded and utilized to acquire the target position point of the flight device, without the need to acquire the aeronautical data from relevant departments. The requirements on operating conditions are low with a wide application range. In addition, the embodiments of the present invention can also enable to filter aeronautical data based on date, time period, and interference duration while achieving the GPS interference source positioning, so as to meet different needs.

Figure 2:
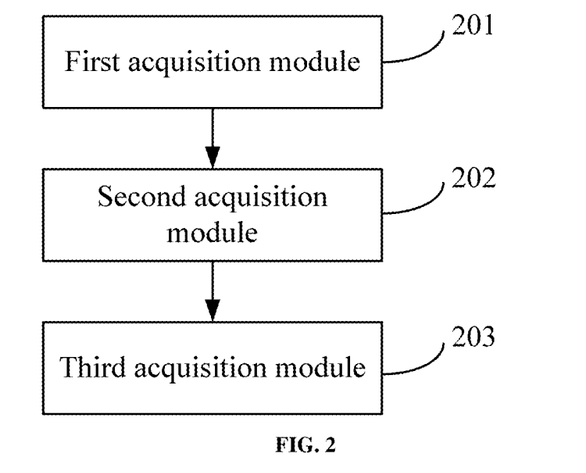
FIG. 2 is a structure diagram of a GPS interference source positioning apparatus according to an embodiment of the present invention.

As shown in FIG. 2, an embodiment of the present invention provides a GPS interference source positioning apparatus, including:

a first acquisition module 201, which is configured for acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;

a second acquisition module 202, which is configured for acquiring a confidence of each ground point in a set of ground points as a positioning point of the GPS interference source according to the first signal strength and the second signal strength;

a third acquisition module 203, which is configured for acquiring a predicted positioning point of the GPS interference source from the set of ground points according to the confidence.

In the embodiment of the present invention, by acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point; acquiring a confidence of each ground point in a set of ground points as a positioning point of the GPS interference source according to the first signal strength and the second signal strength; acquiring a predicted positioning point of the GPS interference source from the set of ground points according to the confidence, the GPS interference source positioning method is thus optimized, ensuring the positioning accuracy, and improving the accuracy and reliability of the positioning results for high GPS interference sources.

Optionally, the apparatus further includes:
a fourth acquisition module, which is configured for acquiring a target signal strength which is the first signal strength or the second signal strength by following steps:
acquiring a target orientation of the ground point relative to a target position point in a GPS antenna pattern of the flight device, wherein the target position point is a position point of the flight device at the first moment or the second moment;
acquiring the target signal strength corresponding to the target orientation in the GPS antenna pattern.

Optionally, the apparatus further includes:
a fifth acquisition module, which is configured for acquiring the target position point by the following steps:
acquiring aeronautical data of the flight device in an automatic dependent surveillance-broadcast (ADS-B) system;
selecting a position information loss route according to the aeronautical data;
extracting the target position point affected by the GPS interference source from the position information loss route.

Optionally, the apparatus further includes:
a first obtaining module, which is configured for acquiring the GPS antenna pattern by following steps:
performing 3D modeling on a body of the flight device to obtain a body model;
performing electromagnetic simulation on a GPS antenna of the flight device on the body model based on diffraction theory to obtain the GPS antenna pattern.

Optionally, the GPS antenna pattern includes correspondences between orientations and gains.

Optionally, the fourth acquisition module is specifically configured for:
acquiring a distance between the ground point and the target position point according to coordinates of the ground point and coordinates of the target position point;
acquiring a first included angle between a target connecting line and a first coordinate axis of the GPS antenna pattern according to the distance; wherein the target connecting line is a connecting line between the ground point and a body mass point of the flight device;
acquiring a second included angle between a projection line of the target connecting line on a first plane of the GPS antenna pattern and a second coordinate axis according to the coordinates of the ground point and the coordinates of the target position point;
acquiring the target orientation according to the first included angle and the second included angle.

Optionally, the apparatus further includes:
a sixth acquisition module, which is configured for acquiring a rotation matrix according to the attitude angle;
a first determining module, which is configured for determining the coordinates of the ground point after rotation according to the rotation matrix.

Optionally, the fourth acquisition module is specifically configured for:
acquiring free space propagation loss according to a distance between the ground point and the target position point and a signal frequency of the GPS interference source located at the ground point;
acquiring the target signal strength according to a target gain corresponding to the target orientation in the GPS antenna pattern and the free space propagation loss.

Optionally, the second acquisition module 202 includes:
a first acquisition unit, which is configured for acquiring an interference source judgment identification value of each ground point in the set of ground points according to the first signal strength and the second signal strength, wherein the interference source judgment identification value is used for indicating whether the ground point can serve as a candidate positioning point for the GPS interference source;
a second acquisition module, which is configured for acquiring the confidence of each ground point in the set of ground points as the positioning point of the GPS interference source based on the interference source judgment identification value corresponding to each position information loss route in a set of position information loss routes.

Optionally, the first acquisition unit is specifically configured for:
if an absolute value of a difference between the first signal strength and the second signal strength is less than or equal to a first threshold, the first signal strength is greater than a second threshold, and the second signal strength is greater than the second threshold, then the interference source judgment identification value is a preset identification value.

Optionally, the third acquisition module 203 is specifically configured for:
selecting a ground point with a highest confidence in the set of ground points as the predicted positioning point of the GPS interference source.

It should be noted that the above apparatus provided by the embodiment of the present invention can achieve all method steps of the GPS interference source positioning embodiment mentioned above, and can achieve the same technical effect. Therefore, the same parts and beneficial effects as the method embodiment in this embodiment will not be described in detail.

Figure 3:
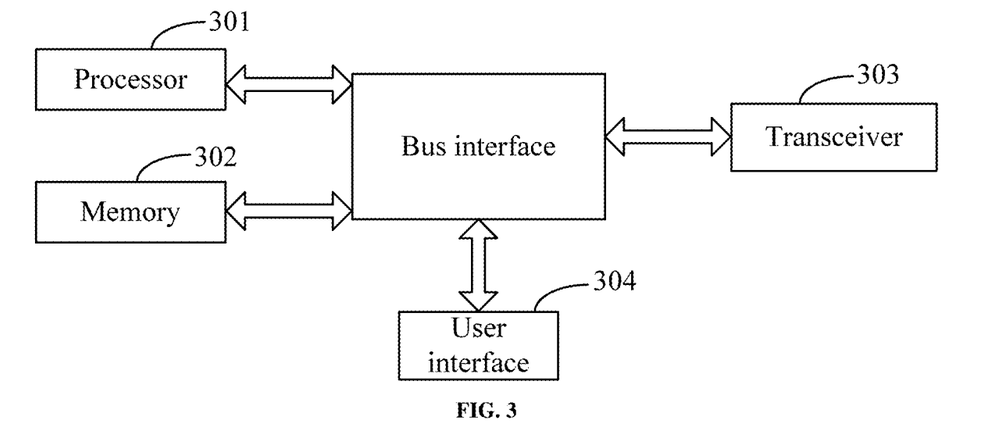
FIG. 3 is a structure diagram of an electronic device according to an embodiment of the present invention.

The embodiment of the present invention also provides an electronic device, as shown in FIG. 3, including a processor 301; and a memory 302 connected to the processor 301 through a bus interface, the memory 302 is used to store programs and data used by the processor 301 during operation. The processor 301 calls and executes the programs and data stored in the memory 302.

The processor 301 is used for reading programs in the memory 302 and executing the following processes:
acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;
acquiring a confidence of each ground point in a set of ground points as a positioning point of the GPS interference source according to the first signal strength and the second signal strength;
acquiring a predicted positioning point of the GPS interference source from the set of ground points according to the confidence.

The transceiver 303 is connected to a bus interface for receiving and sending data under the control of the processor 301.

In FIG. 3, the bus architecture can include any number of interconnected buses and bridges, which are linked together by various circuits of one or more processors represented by the processor 301 and various circuits of memory represented by memory 302. The bus architecture can also link various other circuits such as peripheral devices, regulators, and power management circuits together, which are well-known in the art and will not further described herein. The bus interface provides an interface. The transceiver 303 can be multiple components, including a transmitter and a receiver, providing a unit for communicating with various other devices on a transmission medium. For different user devices, the user interface 304 can also be an interface that can externally connect and internally connect required devices, the connected devices include but not limited to keyboards, monitors, speakers, microphones, joysticks, etc.

The processor 301 is responsible for managing the bus architecture and general processing, while the memory 302 can store data used by the processor 301 during the execution of operations.

Optionally, the processor 301 is also used to read the computer program, to perform the following steps:
acquiring a target signal strength which is the first signal strength or the second signal strength by following steps:
acquiring a target orientation of the ground point relative to a target position point in a GPS antenna pattern of the flight device, wherein the target position point is a position point of the flight device at the first moment or the second moment;
acquiring the target signal strength corresponding to the target orientation in the GPS antenna pattern.

Optionally, the processor 301 is also used to read the computer program, to perform the following steps:
acquiring the target position point by following steps:
acquiring aeronautical data of the flight device in an automatic dependent surveillance-broadcast (ADS-B) system;
selecting a position information loss route according to the aeronautical data;
extracting the target position point affected by the GPS interference source from the position information loss route.

Optionally, the processor 301 is also used to read the computer program, to perform the following steps:
acquiring the GPS antenna pattern by following steps:
performing 3D modeling on a body of the flight device to obtain a body model;
performing electromagnetic simulation on a GPS antenna of the flight device on the body model based on diffraction theory to obtain the GPS antenna pattern.

Optionally, the GPS antenna pattern includes correspondences between orientations and gains.

Optionally, the processor 301 is also used to read the computer program, to perform the following steps:
acquiring a distance between the ground point and the target position point according to coordinates of the ground point and coordinates of the target position point;
acquiring a first included angle between a target connecting line and a first coordinate axis of the GPS antenna pattern according to the distance; wherein the target connecting line is a connecting line between the ground point and a body mass point of the flight device;
acquiring a second included angle between a projection line of the target connecting line on a first plane of the GPS antenna pattern and a second coordinate axis according to the coordinates of the ground point and the coordinates of the target position point;

acquiring the target orientation according to the first included angle and the second included angle.

Optionally, the processor 301 is also used to read the computer program, to perform the following steps:

acquiring a rotation matrix according to the attitude angle;

determining the coordinates of the ground point after rotation according to the rotation matrix.

Optionally, the processor 301 is also used to read the computer program, to perform the following steps:

acquiring free space propagation loss according to a distance between the ground point and the target position point and a signal frequency of the GPS interference source located at the ground point;

acquiring the target signal strength according to a target gain corresponding to the target orientation in the GPS antenna pattern and the free space propagation loss.

Optionally, the processor 301 is also used to read the computer program, to perform the following steps:

acquiring an interference source judgment identification value of each ground point in the set of ground points according to the first signal strength and the second signal strength, wherein the interference source judgment identification value is used for indicating whether the ground point can serve as a candidate positioning point for the GPS interference source;

acquiring the confidence of each ground point in the set of ground points as the positioning point of the GPS interference source based on the interference source judgment identification value corresponding to each position information loss route in a set of position information loss routes.

Optionally, the processor 301 is also used to read the computer program, to perform the following steps:

if an absolute value of a difference between the first signal strength and the second signal strength is less than or equal to a first threshold, the first signal strength is greater than a second threshold, and the second signal strength is greater than the second threshold, then the interference source judgment identification value is a preset identification value.

Optionally, the processor 301 is also used to read the computer program, to perform the following steps:

selecting a ground point with a highest confidence in the set of ground points as the predicted positioning point of the GPS interference source.

It should be noted that the above electronic device provided by the embodiment of the present invention can achieve all method steps in embodiments of the GPS interference source positioning method mentioned above, and can achieve the same technical effect. Therefore, the parts and beneficial effects which are the same as the method embodiments in this embodiment will not be described in detail.

Those skilled in the art can understand that all or part of the steps for implementing the above embodiments can be completed by hardware, or by instructing relevant hardware through a program, the program includes instructions to execute some or all of the steps of the above method; and the program can be stored in a readable storage medium, which can be any form of storage medium.

The embodiment of the present invention also provides a readable storage medium having stored a program or instruction thereon, wherein the program or instruction, when being executed by a processor, causes the processor to implement the GPS interference source positioning method described above.

It should be understood that in several embodiments provided in this application, the disclosed method and apparatus can be implemented in other ways. The apparatus embodiments described above are merely illustrative. For example, the apparatus can be divided into units according to the logical functions, however, in practice, the apparatus can be divided in other ways. For example, a plurality of units or components can be combined or integrated into another system, or some features can be ignored or not executed. Further, the coupling or direct coupling or communication connections with each other as shown or described above can be indirect coupling or communication connections between devices and units through interfaces, which can be electrical and mechanical connections or other forms of connections.

In addition, all the functional units in the embodiments of the present application can be integrated in one processing unit, or each of the units can be an individual unit, or two or more units can be integrated in one unit. The integrated unit described above can be implemented as hardware or can be implemented as a hardware and software function unit.

The integrated unit implemented in the form of software functional units mentioned above can be stored in a computer readable storage medium. The above software product is stored in a storage medium, including several instructions which, when executed by a computer device (such as, a personal computer, a server or a network device), cause the computer device to perform some of the steps of the transmission and reception method of each embodiment of the present application. The storage medium includes a medium capable of storing program codes, such as a USB flash disk, a mobile hard disk, a Read Only Memory (ROM), a Random Access Memory (RAM), a magnetic disk, or an optical disk.

The implementations are merely preferred implementations of the present invention. It should be noted that those of ordinary skills in the art can make improvements and modifications without departing from the principle of the present application, and these improvements and modifications should be considered within the protection scope of the present application.

What is claimed is:

1. A GPS interference source positioning method, comprising:

acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;

acquiring a confidence of each ground point in a set of ground points as a positioning point of the GPS interference source according to the first signal strength and the second signal strength;

acquiring a predicted positioning point of the GPS interference source from the set of ground points according to the confidence;

the method further comprising:

acquiring a target signal strength which is the first signal strength or the second signal strength by following steps:

acquiring a target orientation of the ground point relative to a target position point in a GPS antenna pattern of the flight device, wherein the target position point is a position point of the flight device at the first moment or the second moment;

acquiring the target signal strength corresponding to the target orientation in the GPS antenna pattern;

wherein acquiring the target orientation of the ground point relative to the target position point in the GPS antenna pattern of the flight device comprises:

acquiring a distance between the ground point and the target position point according to coordinates of the ground point and coordinates of the target position point;

acquiring a first included angle between a target connecting line and a first coordinate axis of the GPS antenna pattern according to the distance; wherein the target connecting line is a connecting line between the ground point and a body mass point of the flight device;

acquiring a second included angle between a projection line of the target connecting line on a first plane of the GPS antenna pattern and a second coordinate axis according to the coordinates of the ground point and the coordinates of the target position point;

acquiring the target orientation according to the first included angle and the second included angle;

wherein an attitude angle of the flight device is not a preset angle, the method further comprises:

acquiring a rotation matrix according to the attitude angle;

determining the coordinates of the ground point after rotation according to the rotation matrix;

wherein acquiring the target signal strength of the GPS interference signal received by the flight device at the first moment comprises:

acquiring free space propagation loss according to a distance between the ground point and the target position point and a signal frequency of the GPS interference source located at the ground point;

acquiring the target signal strength according to a target gain corresponding to the target orientation in the GPS antenna pattern and the free space propagation loss.

2. The method of claim 1, further comprising:
acquiring the target position point by following steps:
acquiring aeronautical data of the flight device in an automatic dependent surveillance-broadcast (ADS-B) system;
selecting a position information loss route according to the aeronautical data;
extracting the target position point affected by the GPS interference source from the position information loss route.

3. The method of claim 1, further comprising:
acquiring the GPS antenna pattern by following steps:
performing 3D modeling on a body of the flight device to obtain a body model;
performing electromagnetic simulation on a GPS antenna of the flight device on the body model based on diffraction theory to obtain the GPS antenna pattern.

4. The method of claim 1, wherein the GPS antenna pattern comprises correspondences between orientations and gains.

5. The method of claim 1, wherein acquiring the confidence of each ground point in the set of ground points as the positioning point of the GPS interference source according to the first signal strength and the second signal strength comprises:

acquiring an interference source judgment identification value of each ground point in the set of ground points according to the first signal strength and the second signal strength, wherein the interference source judgment identification value is used for indicating whether the ground point can serve as a candidate positioning point for the GPS interference source;

acquiring the confidence of each ground point in the set of ground points as the positioning point of the GPS interference source based on the interference source judgment identification value corresponding to each position information loss route in a set of position information loss routes.

6. The method of claim 5, wherein acquiring the interference source judgment identification value of each ground point in the set of ground points according to the first signal strength and the second signal strength comprises:

if an absolute value of a difference between the first signal strength and the second signal strength is less than or equal to a first threshold, the first signal strength is greater than a second threshold, and the second signal strength is greater than the second threshold, then the interference source judgment identification value is a preset identification value.

7. The method of claim 1, wherein acquiring the predicted positioning point of the GPS interference source from the set of ground points according to the confidence comprises:

selecting a ground point with a highest confidence in the set of ground points as the predicted positioning point of the GPS interference source.

8. An electronic device, comprising a transceiver, a processor, a memory, and a program or instructions stored on the memory and capable of running on the processor; wherein the processor implements steps in the GPS interference source positioning method of claim 1 when executing the program or instructions.

9. A non-transitory computer-readable storage medium having stored a program or instructions thereon, wherein the program or instructions, when executed by a processor, causes the processor to implement steps of the GPS interference source positioning method of claim 1.

10. A GPS interference source positioning apparatus, comprising:

a first acquisition module, which is configured for acquiring a first signal strength of a GPS interference signal received by a flight device at a first moment, and acquiring a second signal strength of a GPS interference signal received by the flight device at a second moment, wherein the first moment refers to a starting moment when a position of the flight device cannot be acquired, and the second moment refers to a starting moment when the position of the flight device can be re-acquired, the GPS interference signal is sent by a GPS interference source located at a ground point;

a second acquisition module, which is configured for acquiring a confidence of each ground point in a set of ground points as a positioning point of the GPS interference source according to the first signal strength and the second signal strength;

a third acquisition module, which is configured for acquiring a predicted positioning point of the GPS interference source from the set of ground points according to the confidence;

the apparatus further comprising:
a fourth acquisition module, which is configured for acquiring a target signal strength which is the first signal strength or the second signal strength by following steps:
acquiring a target orientation of the ground point relative to a target position point in a GPS antenna pattern of the flight device, wherein the target position point is a position point of the flight device at the first moment or the second moment;
acquiring the target signal strength corresponding to the target orientation in the GPS antenna pattern;
the fourth acquisition module is configured for:
acquiring a distance between the ground point and the target position point according to coordinates of the ground point and coordinates of the target position point;
acquiring a first included angle between a target connecting line and a first coordinate axis of the GPS antenna pattern according to the distance; wherein the target connecting line is a connecting line between the ground point and a body mass point of the flight device;
acquiring a second included angle between a projection line of the target connecting line on a first plane of the GPS antenna pattern and a second coordinate axis according to the coordinates of the ground point and the coordinates of the target position point;
acquiring the target orientation according to the first included angle and the second included angle;
the apparatus further comprising:
a sixth acquisition module, which is configured for acquiring a rotation matrix according to an attitude angle of the flight device;
a first determining module, which is configured for determining the coordinates of the ground point after rotation according to the rotation matrix,
wherein the fourth acquisition module is configured for:
acquiring free space propagation loss according to a distance between the ground point and the target position point and a signal frequency of the GPS interference source located at the ground point;
acquiring the target signal strength according to a target gain corresponding to the target orientation in the GPS antenna pattern and the free space propagation loss.

* * * * *